United States Patent [19]

Mareels

[11] Patent Number: 5,325,766

[45] Date of Patent: Jul. 5, 1994

[54] APPARATUS FOR COOKING FRENCH FRIES FROM PRE-COOKED FROZEN CONDITION

[76] Inventor: Marc Mareels, Botermelkstraat 34, 9400 Ninove, Belgium

[21] Appl. No.: 702,831

[22] Filed: May 20, 1991

[30] Foreign Application Priority Data

May 21, 1990 [EP] European Pat. Off. ......... 90870078.4

[51] Int. Cl.5 .............................................. A47J 37/00
[52] U.S. Cl. ...................................... 99/357; 99/407
[58] Field of Search ................. 99/330, 352, 355, 357, 99/403, 407–410, 483; 222/55, 58, 77, 146.1, 146.6, 415, 166, 504, 505; 62/93, 440

[56] References Cited

U.S. PATENT DOCUMENTS

| | | | |
|---|---|---|---|
| 3,448,677 | 6/1969 | Dexters | 99/407 |
| 3,492,831 | 2/1970 | Maurer | 62/93 |
| 3,818,820 | 6/1974 | Harris | 99/407 |
| 3,839,951 | 10/1974 | Palmason | 99/408 |
| 4,332,189 | 6/1982 | Stuck | 99/407 |
| 4,359,935 | 11/1982 | Murray | 99/407 |
| 4,428,280 | 1/1984 | Williams | 99/407 |
| 4,489,647 | 12/1984 | Stamps | 99/407 |
| 4,632,835 | 12/1986 | Norris | 99/483 |
| 4,722,267 | 2/1988 | Galockin | 99/407 |
| 4,785,725 | 11/1988 | Tate | 99/407 |
| 4,821,633 | 4/1989 | Ripatonda | 99/352 |
| 5,003,868 | 4/1991 | Higgins | 99/407 |
| 5,018,438 | 5/1991 | Grandi | 99/407 |
| 5,069,116 | 12/1991 | Marquez | 99/407 |

FOREIGN PATENT DOCUMENTS

| | | | |
|---|---|---|---|
| 2491031 | 4/1982 | France | 99/407 |
| 294841 | 4/1965 | Netherlands | 99/407 |
| 13021 | 11/1900 | Sweden | 222/55 |

Primary Examiner—Timothy F. Simone
Assistant Examiner—Terrence R. Till
Attorney, Agent, or Firm—C. J. Fildes & Co.

[57] ABSTRACT

An apparatus for cooking French fries from a frozen pre-cooked condition that includes a bin (2) from which the frozen French fries may be delivered in a predetermined quantity to a first basket (11) via a balance (8). Bin (2) and balance (8) are placed in an enclosure (1) where a freezing temperature prevails. A cold airflow is kept in said enclosure and is circulated over evaporator (16) of cooling device placed in this enclosure to dry the air and therefore avoid clustering of the French fries due to frosting.

5 Claims, 3 Drawing Sheets

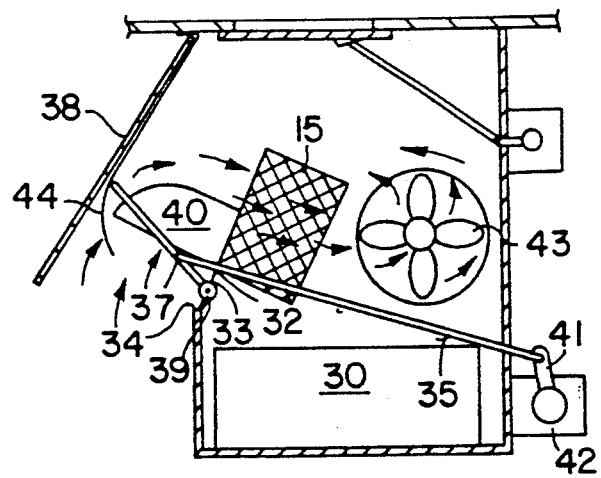
F I G. 5
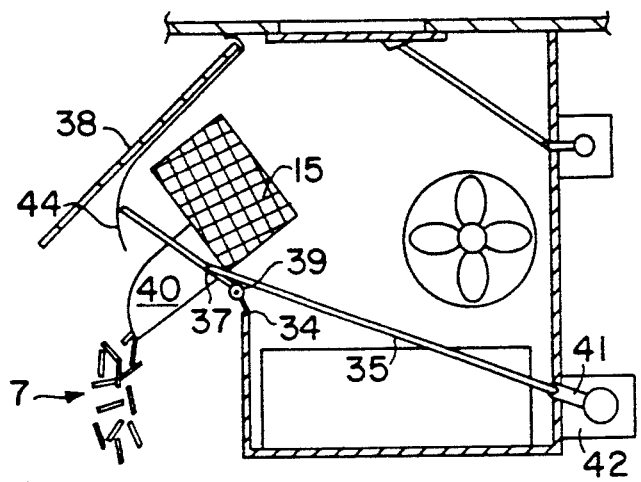
F I G. 6
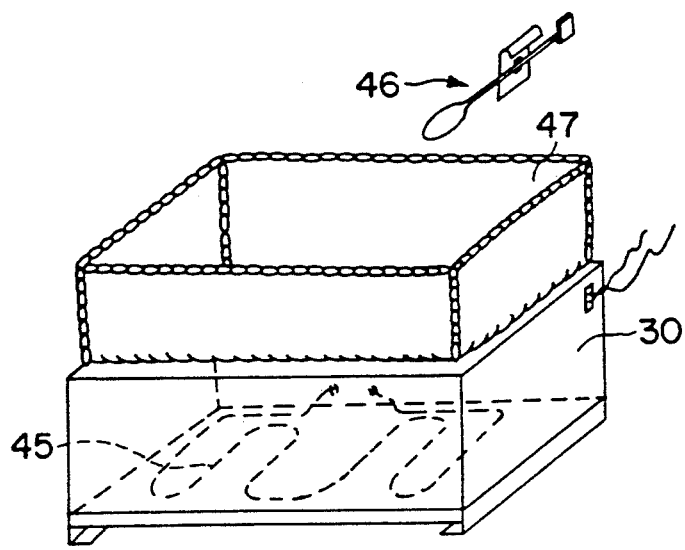
F I G. 7

APPARATUS FOR COOKING FRENCH FRIES FROM PRE-COOKED FROZEN CONDITION

TECHNICAL FIELD

This invention relates to a cooking apparatus for frozen French fries and more particularly to a cooking apparatus which makes is possible to correctly produce cooked French fries in a minimum period of time, making use, at the beginning, of pre-cooked French fries kept in a frozen state, while avoiding problems arising from the use of frozen products, and in this case fries, which tend to stick together due to the well-known icing phenomenon.

BACKGROUND ART

The storage of French fries in a frozen state in a bin, their distribution in measured quantities and their cooking to produce a high-quality product, pose various problems which to date have not all been satisfactorily resolved. Specifically, pre-cooked and frozen French fries, covered with ice, do not produce a satisfactory product after they are cooked in boiling oil.

DISCLOSURE OF INVENTION

An object of the present invention is to provide an apparatus that eliminates the icing phenomenon associated with frozen French fries.

A further object of the invention is to obtain crispy French fries from subsequently cooked formerly frozen French fries.

To correct the numerous drawbacks of distributors known to date, the apparatus constructed in accordance with the present invention is primarily characterized in that it has a bin from which the French fries may be delivered to a first basket forming part of a balance. The bin and balance are placed in an enclosure where freezing temperatures prevail. A cold air flow is maintained in said enclosure and is circulated over an evaporator of a cooling device placed in this enclosure to dry the air and thaw out the fries.

In an especially advantageous embodiment of the invention, the first basket mentioned above is sealed at its base by a pivoting spout and the first basket is in the form of a spout.

Still according to the invention, the above enclosure is placed above a basic enclosure separated from the first one by a partition and an isothermic trap synchronized with the aforementioned pivoting spout.

In an advantageous embodiment, the above spout is joined at the above-mentioned trap by a linking means, such as a cable to synchronize the pivoting of this spout with the opening of the aforementioned trap.

According to a remarkable feature of the invention, a fan is provided to cause an airflow inside the above-mentioned basic enclosure when the front door of the enclosure is open; the airflow being directed to the French fries in the cooking basket when the cooking basket is stopped during its rocking phase.

Other objects, features and advantages of the invention are readily apparent and will be revealed from the following detailed description which will be provided below in connection with the accompanying drawings.

BRIEF DESCRIPTION OF THE DRAWINGS

FIG. 5 is another view similar to FIG. 3 illustrating a phase in which airflow is circulated over the French fries still contained in the cooking basket after rocking movement of the basket is stopped;

FIG. 6 is another view similar to FIG. 3 illustrating a phase in which the French fries are poured into a container; and FIG. 7 is a perspective view illustrating an alternative balance an in an exploded view, an oil container, perforated aluminum sheet and an oil level detector.

BEST MODE FOR CARRYING OUT THE INVENTION

Figure 1:
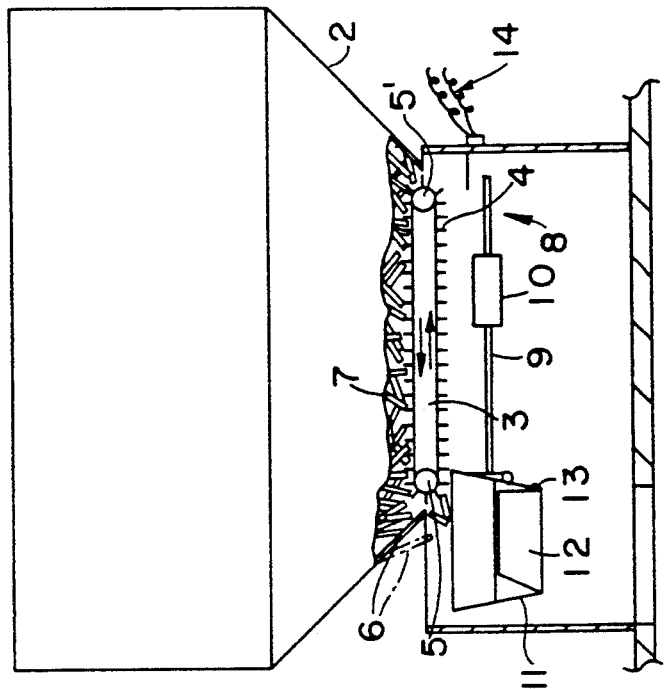
FIG. 1 is an elevational schematic cross-sectional view of the cooking apparatus constructed in accordance with the present invention illustrating a bin containing the frozen fries, a balance and evaporator of a cooling device, all of these elements being installed in an enclosure.
Figure 2:
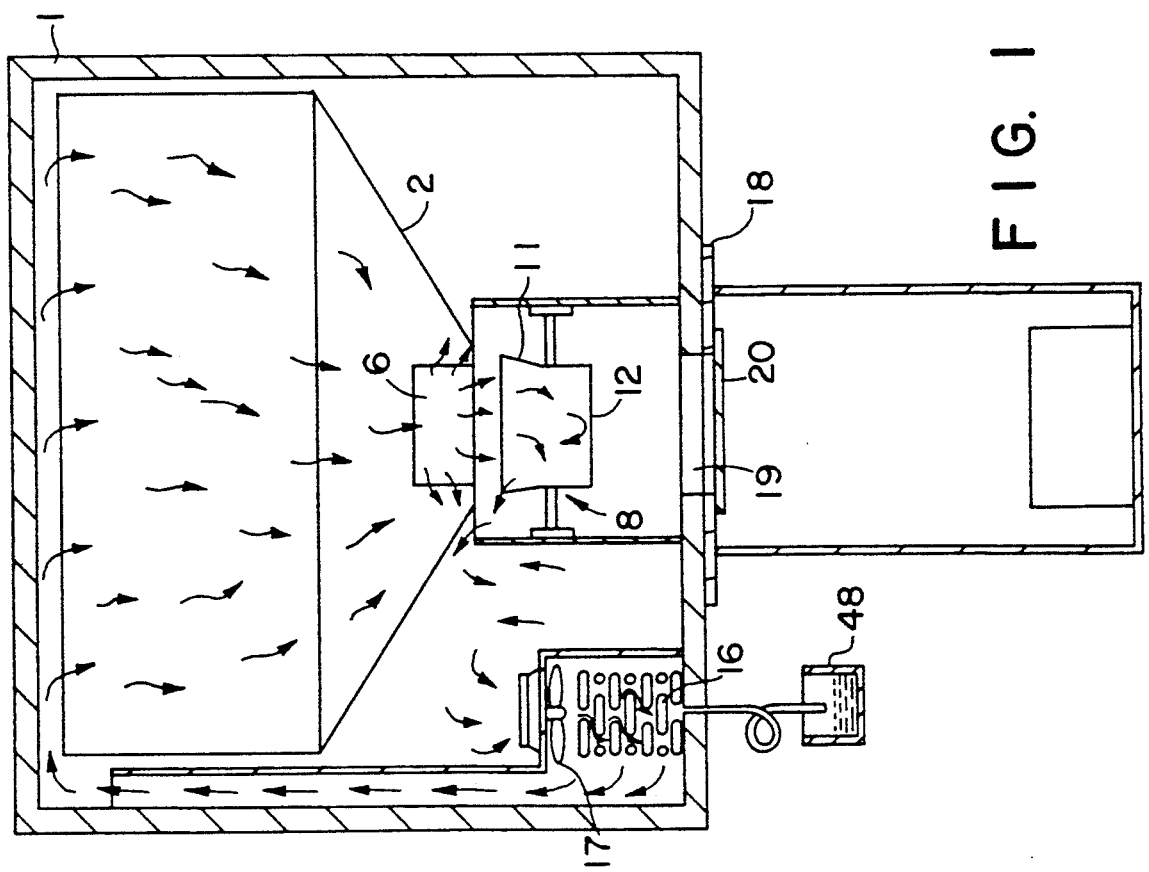
FIG. 2 is an elevational schematic cross-sectional view of the cooling apparatus of FIG. 1 illustrating the bin, a conveyor belt and a first basket installed on the balance.

Referring to FIGS. 1–7, the cooking illustrated has an outer cover, which is not represented. The various figures illustrating the various phases are not shown separately in an illustration.

Essentially, the apparatus is characterized by an enclosure 1 inside of which the freezing temperature prevails. A bin 2 is placed inside this enclosure 1 which is sealed at its base by a flexible conveyor belt 3, fitted with flexible fingers 4 and guided over a driving cylinder 5 and return cylinder 5'. A valve is provided at the base of the bin 2 to control the passage of French fries 7.

A balance 8 is placed in enclosure 1 and is represented by lever 9 equipped with a displaceable counterbalance 10. Lever 9 bears first basket 11 having the general shape of a spout. The bottom of the basket 11 is sealed by a pivoting spout 12. The hinging point of this spout 12 is located at 13. A "reed" type switch 14, influenced by the movements of the balance 8, is responsible for the moving and stopping the conveyor belt 3. The displacement time of the conveyor belt 3 therefore corresponds to a predetermined weight of the French fries in the first basket 11.

The design of the pivoting spout 12 makes it possible to correctly direct the French fries toward cooking basket 15 which is described below.

An evaporator 16 is placed in enclosure 1, and belongs to the cooling device.

Airflow, depicted by numerous arrows, circulates in enclosure 1 and is fed there from a fan 17. The role of this cold airflow is very important and is described below.

The base of enclosure 1 is made up of a partition 18 with hole 19, sealed by an isothermic trap 20.

Figure 3:
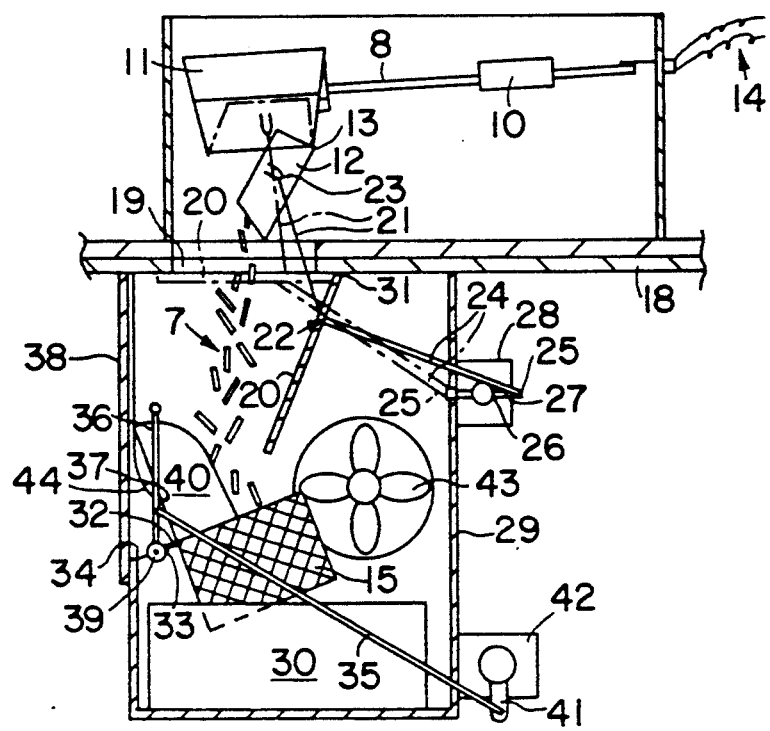
FIG. 3 is another elevational schematic cross-sectional view of the cooling apparatus of FIG. 1 illustrating a phase during which the French fries are emptied from the balance to be delivered to a cooking basket.
Figure 4:
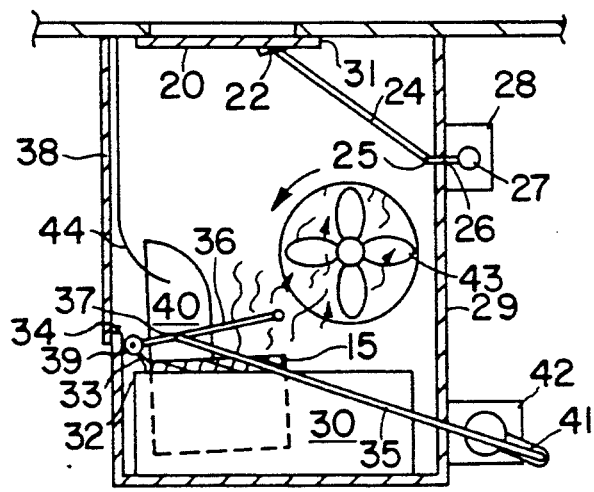
FIG. 4 is another view similar to FIG. 3 illustrating a cooking phase.

In referring more particularly to FIGS. 3 and 4, we can see the synchronism between trap 20 and first basket 11 which seals bin 2 at its base.

Actually, trap 20, which is hinged at 31 to partition 18, is connected by cable 21 connected to pivoting spout 12. Cable 21 is fastened at 22 to trap 20 and 23 on pivoting spout 12.

As already stated, pivoting spout 12 is hinged at 13 to first basket 11. A return spring is also provided at this point which returns pivoting spout 12 to the position in which it seals the base of first basket 11.

Isothermic trap 20 is operated by lever 24, which is hinged in 22 on trap 20 and in 25 on small lever 26 fastened to pin 27 of motor 28 with programmed control.

The closed and open positions of trap 20 are depicted with dotted lines and solid lines in FIG. 3.

The position in which trap 20 is kept open is calculated so that the French fries reach right into cooking basket 15.

It is preferred to place a pivoting trap around a horizontal axis to create a downward flow of cold air, when the trap in question is opened, rather than permitting an upward flow of hot air toward the enclosure 1 in which a freezing temperature prevails.

Trap 20 is displaced inside a basic enclosure where a much higher temperature prevails, since this basic enclosure, bearing reference 29, contains cooking tub 30 in which cooking basket 15 is immersed. The latter is hinged by one end to 32 over a small lever 33, the other end of which is hinged at 34 to basic enclosure 29.

Two levers 35 and 36, hinged to each other at 37, cause rocking movements of cooking basket 15 and front door 38 to open. Lever 36 is itself hinged at its base in 39 to small lever 33 mentioned above. Cooking basket 15 is provided with pouring spout 40.

Lever 35 is activated, by rod 41 from programmed motor 42.

Fan 43 is provided in basic enclosure 29 to produce an airflow at ambient temperatures over cooked fries. The purpose of this operation is of capital importance, since it is possible to obtain crispy fries.

The opening of front door 38 is caused by pressure exerted by lever 36 on curved rod 44. The moment where this pressure is exerted is represented in FIG. 5.

The position represented by this FIG. 5 is also that where programmed motor 42 is stopped. The rocking of the cooking basket is stopped and at this stage fan 43 produces an airflow over the cooked fries at ambient temperature which makes them crispy. This phase of the cooking process is therefore of primary importance and is considered to be an essential characteristic of the invention.

During the next phase, illustrated by FIG. 6, the rocking of the cooking basket continues and French fries 7 are poured into a container, not shown in the figures. The distribution of these containers from a reserve can take place in different ways.

Curved rod 44 acts at its peak on front door 38 like a spring and provides an airtight sealing of this front door.

The base of cooking tub 30 is equipped with heating resistors 45 and level detector 46 which is illustrated in FIG. 7.

On the inside, cooking tub 30 is covered with a perforated aluminum sheet 47 or other sheet having the same technical properties. It is therefore possible to remove this sheet, which collects impurities from the inside of cooking tub 30 and replace it with a clean sheet.

From the description just provided, it will be noted that the cooking apparatus for fries according to the invention, in addition to its programmed control means, executes two phases which are characteristics of the invention.

These phases are:

a). Defrosting the frozen French fries when the remain in bin 2 and, in particular, in first basket 11. This defrosting is caused by a cold and dry airflow. The air drying is caused during its passage over evaporator 16. The periodic defrosting of the latter is provided and the water is discharged from this evaporator at water trap 48; and b). Air is blown over the French fries at ambient temperature immediately before they are poured while they remain in cooking basket 15. This important phase makes it possible to obtain crispy fries, which is an objective which is not reached in automatic apparatuses known to date.

While the best mode for carrying out the invention has been described in detail, those familiar with the art to which this invention relates will recognize various alternative designs and embodiments for practicing the invention as defined by the following claims.

What is claimed is:

1. Apparatus for cooking French fries from a frozen pre-cooked condition, characterized in that the apparatus includes a first enclosure wherein a freezing temperature prevails, a bin mounted in said enclosure for holding French fries, a first basket having a base and defining in part a balance and mounted in said enclosure and being below said bin for receiving French fries from said bin, a lever fitted with an adjustable counterbalance completing the definition of said balance, and an evaporator mounted on said enclosure over which a cold airflow is maintained to dry the air therein the first enclosure and therefore defrost the French fries, a flexible conveyor belt defined in part by a plurality of flexible fingers mounted in said enclosure below said bin and above said first basket, said conveyor being operable to deliver French fries, extracted by gravity from said bin to make said fries fall, into said first basket, said first basket being sealed at said base by a pivoting spout, said first basket being in the form of a funnel, said first enclosure being placed above a second enclosure and separated from said first enclosure by an isothermic partition and trap, the opening of said trap begin synchronized with the pivoting of said pivoting spout, said trap being controlled by an electric motor with programmed control, said lever being equipped with a "reed" switch for moving and stopping said conveyor, said pivoting spout being hinged to said first basket and forming the bottom of said basket, said pivoting spout being joined to said trap by a link, defined as a cable to synchronize the pivoting of said spout with the opening of said trap, said trap being downwardly openable and the trap in an open position directing the French fries, which fall under the influence of gravity, into a cooking basket, said cooking basket being installed to rock relative to said second enclosure and the rocking being caused by a set of levers from an electrical motor with programmed control, said set of levers including a first lever activated directly by said electric motor, said lever being hinged to a second lever and installed to pivot relative to said second enclosure, all things are such that the activation of said first lever acts on the rocking of said cooking basket and on said second lever which, when said cooking basket is in a rocked position, said cooking basket pushes on a means for opening a front door forming part of said second enclosure.

2. Apparatus according to claim 1 characterized in that said cooking basket is provided, on a side directed toward said front door, with a pouring spout.

3. Apparatus according to claim 2 characterized in that said apparatus further comprises a cooking tub designed to receive cooking oil, in which an aluminum sheet is adapted which may be removed on a regular basis and replaced by a new one.

4. Apparatus according to claim 3 characterized in that an oil level detector is installed in said cooking tub to stop the operation of the cooking tub when the oil level falls, indicating the necessity of replacing the oil.

5. Apparatus according to claim 3 characterized in that a fan is provided in said second enclosure, said fan directing an airflow over the French fries in said cooking basket when said front door is open and the rocking motion of the cooking basket is stopped, to make the cooked French fries crispy.

* * * * *